United States Patent [19]

Darnall, Jr.

[11] 4,136,150
[45] Jan. 23, 1979

[54] METHOD FOR MOLDING A CURVED FLEXIBLE PRINTING PLATE

[75] Inventor: John C. Darnall, Jr., Thousand Oaks, Calif.

[73] Assignee: The Times Mirror Company, Los Angeles, Calif.

[21] Appl. No.: 652,836

[22] Filed: Jan. 27, 1976

Related U.S. Application Data

[62] Division of Ser. No. 499,662, Aug. 22, 1974, Pat. No. 3,986,698.

[51] Int. Cl.² .............................................. B29C 7/00
[52] U.S. Cl. .................................... 264/318; 264/334; 425/441; 425/DIG. 5
[58] Field of Search ............... 264/318, 334, 335, 336; 425/DIG. 5, 438, 441

[56] References Cited

U.S. PATENT DOCUMENTS

| | | | |
|---|---|---|---|
| 500,682 | 7/1893 | Vallee | 425/DIG. 5 |
| 1,036,416 | 8/1912 | Aylsworth | 264/335 |
| 2,948,031 | 8/1960 | Webb | 425/DIG. 5 |
| 3,444,288 | 5/1969 | Mead | 264/313 X |
| 3,618,170 | 11/1971 | Owens | 425/436 X |

Primary Examiner—Thomas P. Pavelko
Attorney, Agent, or Firm—Christie, Parker & Hale

[57] ABSTRACT

A flexible printing plate is separated from the inner surface of a curved matrix after formation of the plate in a mold by first moving the ends of the plate inwardly away from the matrix, while maintaining the center of the plate in stationary contact with the matrix, and then moving the center of the plate inwardly away from the matrix, while maintaining the ends of the plate away from the matrix. The matrix is held in an outer mold half, and the printing plate is formed in a mating inner mold half having a center section with sloping side surfaces that converge toward the outer mold half, a first end section having a side surface contiguous to one sloping side surface of the center section, and a second end section having a side surface contiguous to the other sloping side surface of the center section.

12 Claims, 14 Drawing Figures

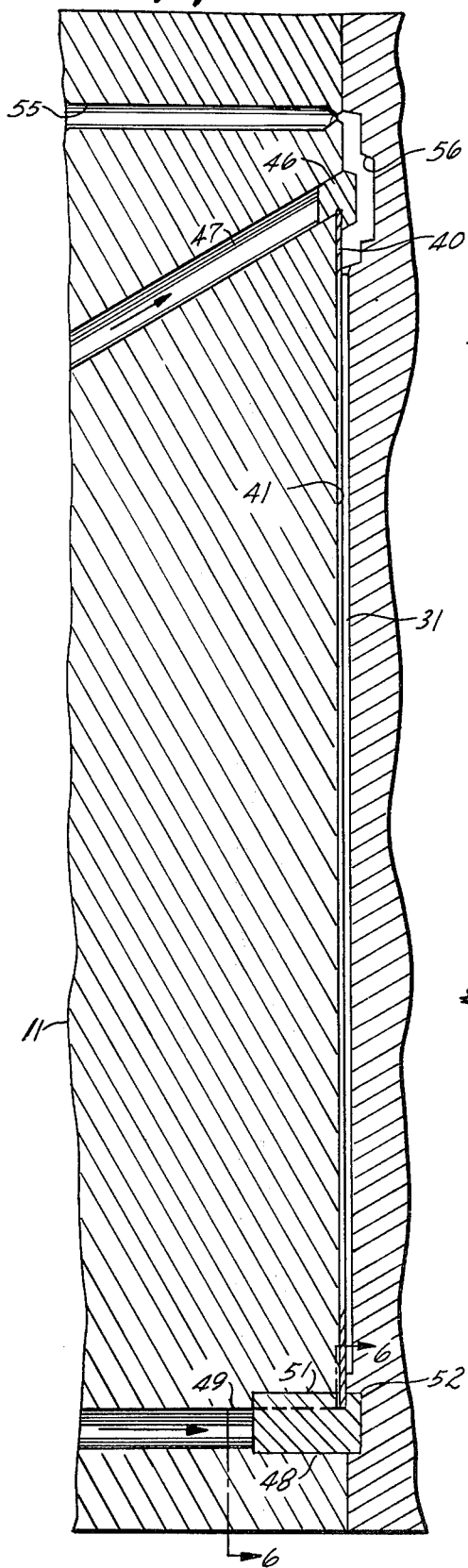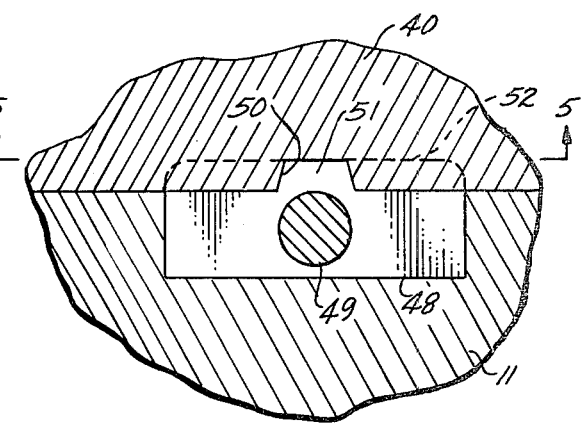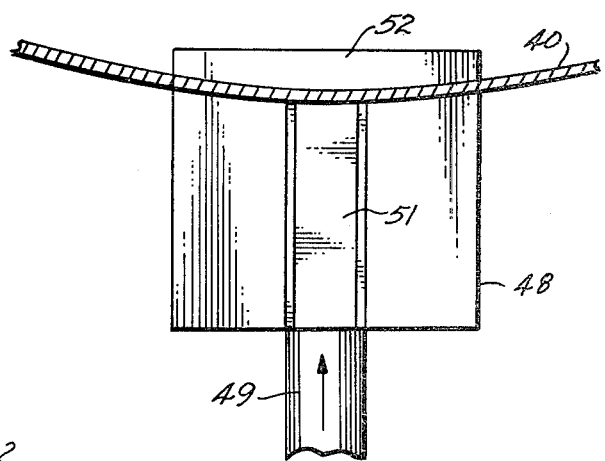

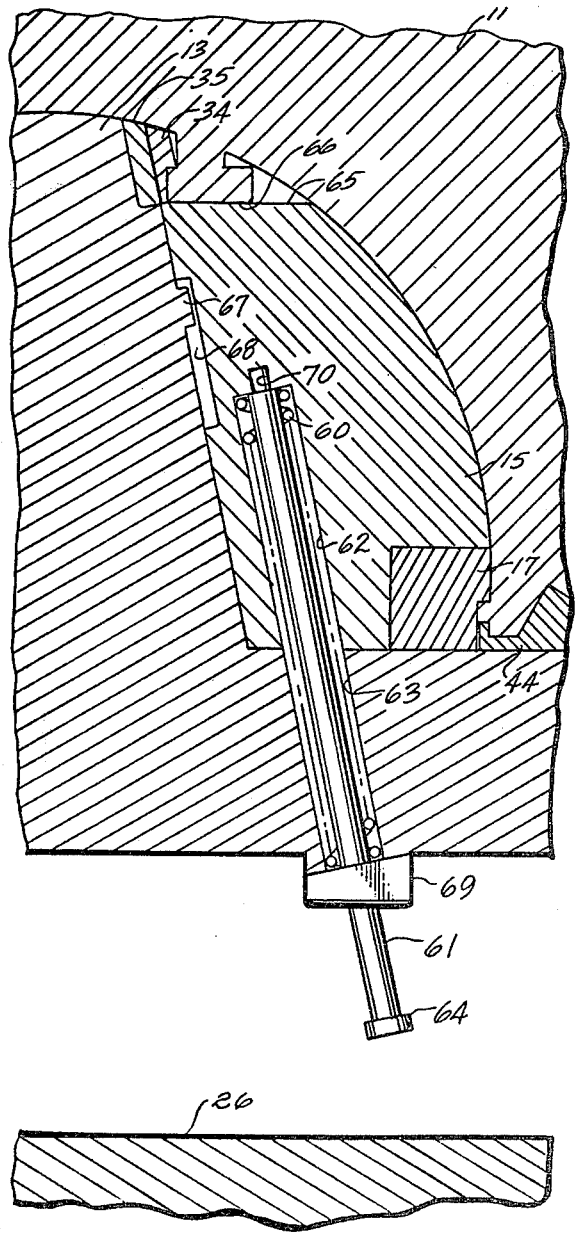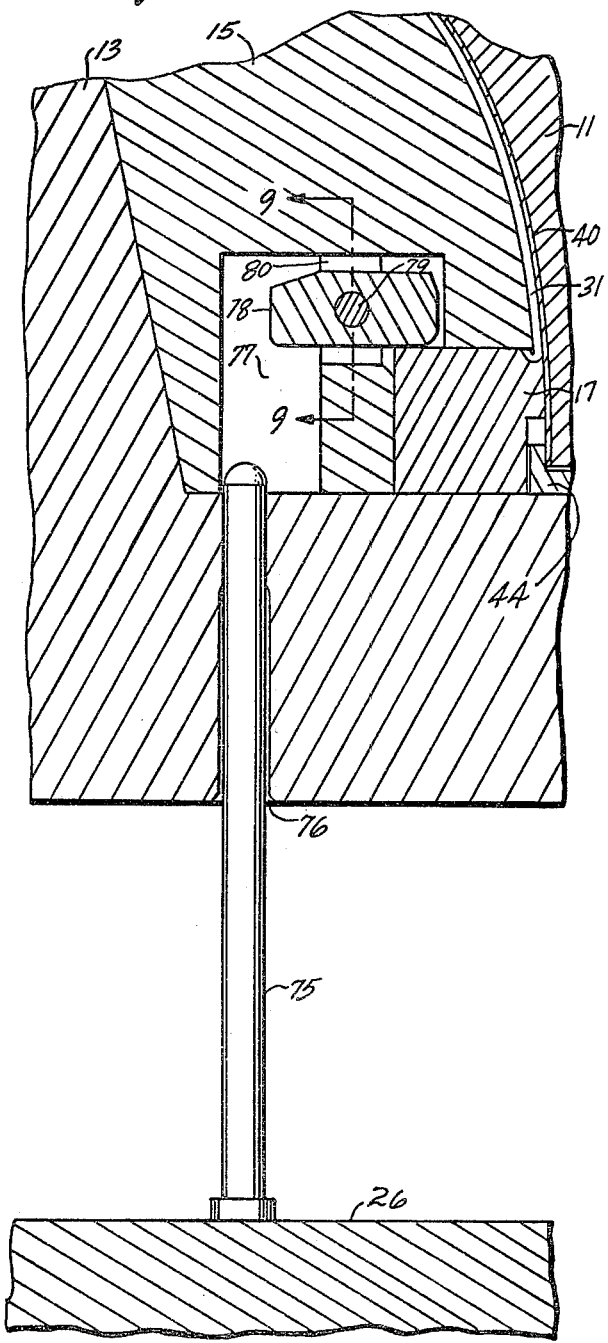

METHOD FOR MOLDING A CURVED FLEXIBLE PRINTING PLATE

CROSS REFERENCE TO RELATED APPLICATIONS

This is a division of application Ser. No. 499,662 filed Aug. 22, 1974 which issued as U.S. Pat. No. 3,986,698 on Oct. 19, 1976.

BACKGROUND OF THE INVENTION

This invention relates to the production of printing plates and, more particularly, to a method and apparatus for separating and releasing a curved flexible printing plate after its formation in a mold.

Recently, there have been developed flexible materials that offer great promise as a replacement for rigid metal printing plates. These flexible materials are plastic. Flexible plastic printing plates are lighter and cheaper than metal plates, have a longer press life, and provide a more accurate representation of the matter to be printed. Until now, flexible plastic printing plates have been produced in a flat mold, as illustrated in U.S. Pat. No. 3,743,463, which issued July 3, 1973 to Richard B. Patrick and John Sonia. The thought process of those working in the art seems to have been that flexible flat plates can be bent easily enough to conform to the curved surface of the cylinder. The flexible plates in the prior art are, therefore, flat in their unstressed condition and become stressed when bent to conform to the curvature of the plate cylinder on which they are mounted.

Flexible printing plates that are flat in their unstressed condition must be held under great longitudinal tension by the cylinder attaching members in order to make the plate fully conform to the cylinder over its entire surface. If insufficient longitudinal tension is applied to the plate, background areas on the plate are falsely printed. If too much longitudinal tension is applied to the plate, the matter to be printed becomes distorted and the plate may creep, i.e., become permanently deformed, and satisfactory color registration cannot be established.

Newspaper printing presents special problems that must be overcome before the use of flexible printing plates becomes practical. In the course of the daily operation of newspaper presses, many printing plates must be installed on and removed from the plate cylinders to print the pages of the various editions. For example, a major newspaper may require a half million or more printing plates a year. Accordingly, the cylinder attaching arrangement must permit fast, easy installation and removal of the printing plates. Further, it is typical for editions with large distribution that a number of presses simultaneously print the same pages, so multiple printing plates, as many as fifteen or more, are then required.

My application Ser. No. 478,826, filed June 12, 1974, now abandoned, teaches that a flexible printing plate should be molded with the same curvature as the cylinder on which the plate is mounted. Thus, the plate is unstressed when it conforms to the surface of the cylinder and no longitudinal bending strain results. To attach the printing plate to the cylinder, inwardly bent, laterally extending hooks at the ends of the plate engage projections on the cylinder.

SUMMARY OF THE INVENTION

According to the present invention, a flexible printing plate is separated from the inner surface of a curved matrix after formation of the plate in a mold by first moving the ends of the plate inwardly away from the matrix, while maintaining the center of the plate in stationary contact with the matrix, and then moving the center of the plate inwardly away from the matrix, while maintaining the ends of the plate away from the matrix. This plate releasing technique permits the entire surface of the plate to separate from the matrix, while moving approximately in a radially inward direction, to effect such separation, without impairing the quality of the impressions transferred thereto from the matrix.

BRIEF DESCRIPTION OF THE DRAWINGS

The features of a specific embodiment of the best mode contemplated of carrying out the invention are illustrated in the drawings, in which:

FIG. 4 is a side sectional view of a portion of the molding apparatus illustrating the arrangement for indexing and securing the curved matrix;

FIG. 5 is a top sectional view of part of the matrix indexing and securing arrangement;

FIG. 6 is a front sectional view of part of the matrix indexing and securing arrangement;

FIG. 7 is a top sectional view of a portion of the molding apparatus depicting part of the mechanical interconnection between the center section and one end section of the inner mold half;

FIG. 8 is a top sectional view of a portion of the molding apparatus depicting part of the mechanical interconnection between one end section of the inner mold half and its corresponding attaching block;

DETAILED DESCRIPTION OF THE SPECIFIC EMBODIMENT

Figure 1A:
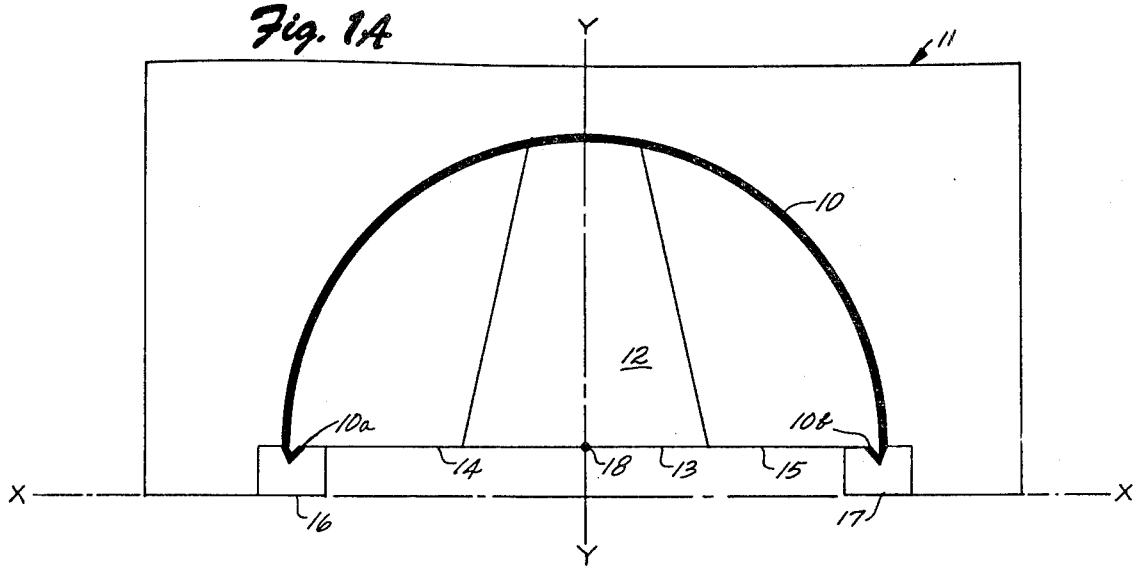
FIGS. 1A through 1E are schematic diagrams of inner and outer mold halves depicting the sequence of operations that occur in the course of the separation and release of a flexible printing plate from a curved matrix by the inventive technique.

Apparatus for molding a curved flexible plastic printing plate 10 is disclosed in schematic form in a top view in FIGS. 1A through 1E. Plate 10 is formed between an outer mold half 11 and a mating inner mold half 12, which comprises a center section 13 and end sections 14 and 15. Center section 13 has sloping side surfaces that converge toward outer mold half 11, and end sections 14 and 15 each have a side surface contiguous to one of the sloping side surfaces of center section 13. At its ends, plate 10 has laterally extending inwardly bent attaching hooks 10a and 10b. The ends of plate 10 are attached to end sections 14 and 15 by attaching bars 16 and 17, respectively. Bars 16 and 17 and end sections 14 and 15, respectively, have cavities in which hooks 10a and 10b are formed. The inside surface of each hook is formed by the cavity portion of the corresponding end section, and the outside surface of each hook is formed by the cavity portion of the corresponding attaching bar. An X-axis and a Y-axis lie in a horizontal plane and the axis of curvature of plate 10, represented by a point 18 is vertical. Plate 10 preferably has a right cylindrical curvature and is slightly smaller than one-half of a right cylinder so that two such printing plates can be mounted end-to-end on the printing cylinder of a conventional rotary letter press.

FIG. 1A shows inner mold half 12 mated with outer mold half 11 immediately after the formation of printing plate 10. Attaching bars 16 and 17 are contiguous to end sections 14 and 15, respectively, of inner mold half 12. Thus, the ends of plate 10 are clamped against end sections 14 and 15 by bars 16 and 17, respectively.

Figure 1B:
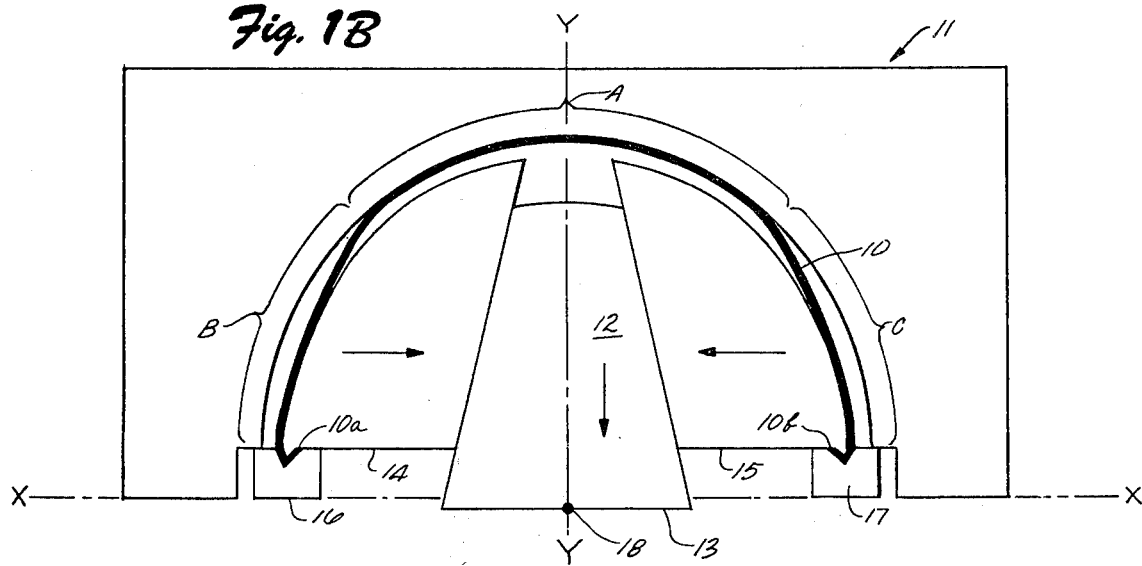

FIG. 1B shows the initial phase of the separation of inner mold half 12 from outer mold half 11. Center section 13 moves a first incremental distance along the Y-axis. Movement of end sections 14 and 15 along the Y-axis is prevented, while maintaining contiguity with center section 13. Consequently, end sections 14 and 15 move together along the X-axis as center section 13 moves along the Y-axis. During this movement of end sections 14 and 15 together along the X-axis, the ends of plate 10 are drawn away from outer mold half 11 by attaching bars 16 and 17, which move as a unit with end sections 14 and 15, respectively. The center of plate 10 bows outwardly by virtue of its flexibility and the reduction in the perimeter of inner mold half 12 caused by the movement of end sections 14 and 15 together. The outward bowing of plate 10 pushes approximately the entire center half of plate 10, embraced by a bracket labeled "A", into contact with outer mold half 11, pulls approximately the end quarters of plate 10, embraced by brackets labeled "B" and "C", away from outer mold half 11, and creates sharp points of departure of plate 10 away from outer mold half 11 at the intersections of brackets "A" and "B" and brackets "A" and "C".

Figure 1C:
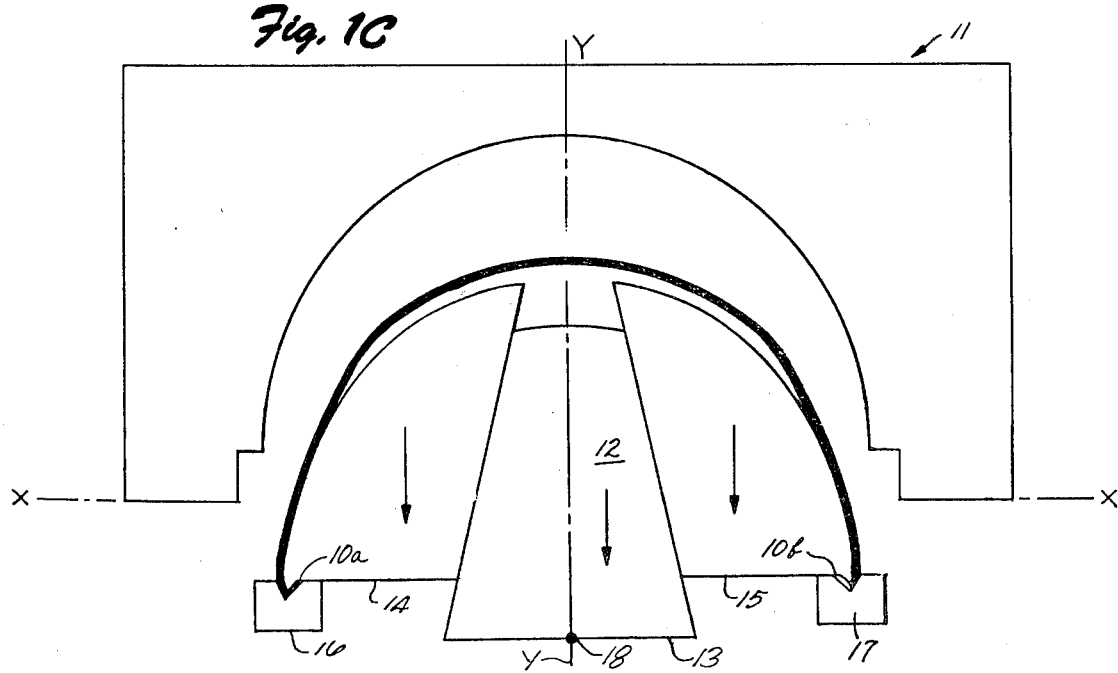

FIG. 1C shows the final phase of the separation of inner mold half 12 from outer mold half 11. Center section 13 moves a second incremental distance along the Y-axis. As center section 13 moves through the second incremental distance, end sections 14 and 15 and attaching bars 16 and 17 all move with it as a unit along the Y-axis. Consequently, the center half of plate 10, i.e., the portion embraced by bracket "A", separates from the surface of outer mold half 11. As depicted in FIGS. 1B and 1C, the first incremental distance of movement of center section 13 is closer to outer mold half 11 than the second incremental distance of movement thereof.

To summarize the two phase separation of inner half mold 12 from outer mold half 11, the ends of plate 10 are first moved radially inward away from outer mold half 11, while maintaining the center of plate 10 in stationary contact with outer mold half 11, and then the center of plate 10 is moved radially inward away from outer mold half 11, while maintaining the ends of plate 10 away from outer mold half 11. This technique preserves the quality of the impressions transferred to plate 10 by a matrix mounted on outer mold half 11, because over its entire surface area plate 10 separates over the matrix while moving in a direction approximately perpendicular to the surface of the matrix, i.e., approximately in a radially inward direction. In contrast, if the entire inner mold half were to separate from the outer mold half as a unit, the surface area at the ends of the printing plate would be moving approximately parallel to the surface of the matrix during separation therefrom. This would subject the print on this surface area to extraordinary shear force, due to the interlocking nature of the adjacent surfaces of the plate and the matrix.

Figure 1D:
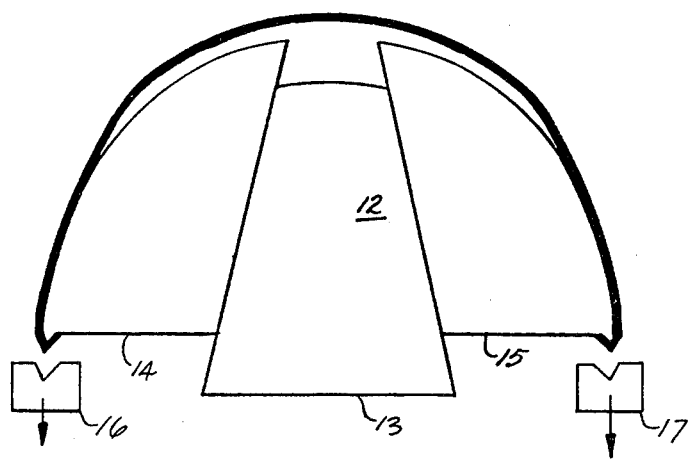

FIG. 1D shows the release of the ends of plate 10 by attaching bars 16 and 17. As center section 13 moves as a unit with end sections 14 and 15 a third incremental distance along the Y-axis, attaching bars 16 and 17 move along the Y-axis away from end sections 14 and 15 so as to separate from the outer surfaces of hooks 10a and 10b, respectively.

Figure 1E:
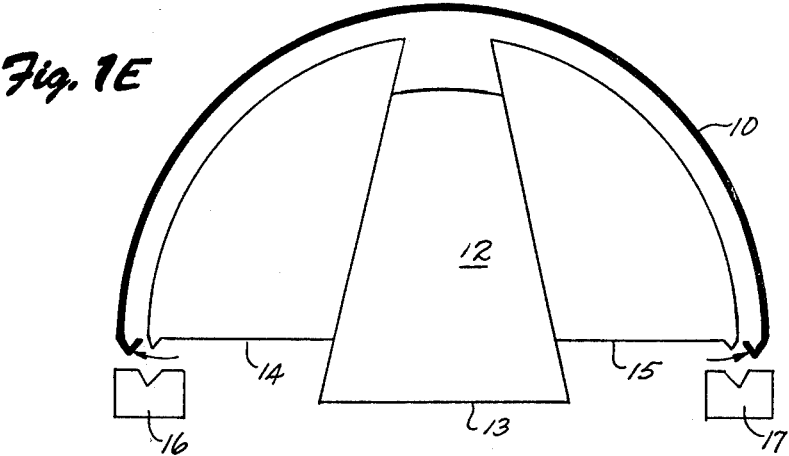

FIG. 1E shows the separation of plate 10 from inner mold half 12. As center section 13 moves as a unit with end sections 14 and 15 a fourth incremental distance, hooks 10a and 10b of plate 10 are flipped by pins described in detail below in connection with FIG. 10 outwardly away from end sections 14 and 15 in opposite directions of rotation, as indicated by the arrows. As a result, plate 10 peels off the surface of inner mold half 12 from its ends toward its center, and drops downwardly out of the region between outer mold half 11 and inner mold half 12. A conveyor belt or other mode of transportation for plate 10 could be located directly underneath the molding apparatus to intercept plate 10 as it falls and remove it to a trimming station.

Figure 2:
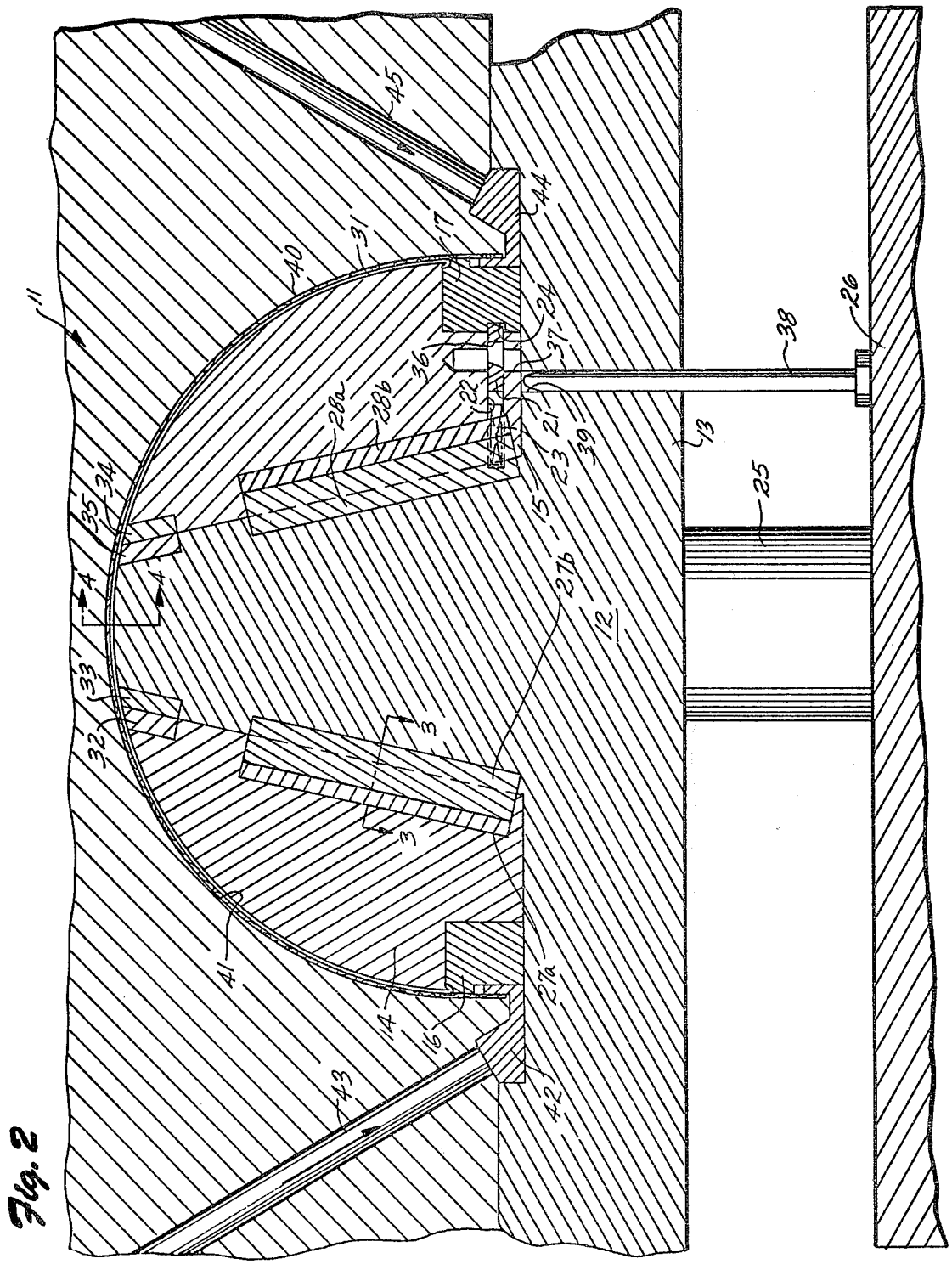
FIG. 2 is a top sectional view of molding apparatus incorporating the features of the invention.

Reference is made to FIG. 2 for a top sectional view of the molding apparatus depicted schematically in FIGS. 1A through 1E. Inner mold half 12 is shown mated with outer mold half 11. The outer surfaces of center section 13 and end sections 14 and 15 are recessed to define a plate forming cavity 31. Plate 10 is not depicted in FIGS. 2 through 10. An arm 25 connects center section 13 to a hydraulic actuator 26, to provide the force that moves center section 12 away from outer mold half 11. Interlocking bearings 27a and 27b are located along the contiguous surfaces of center section 13 and end section 14, and interlocking bearings 28a and 28b are located along the contiguous surfaces of center section 13 and end section 15.

Figure 3:
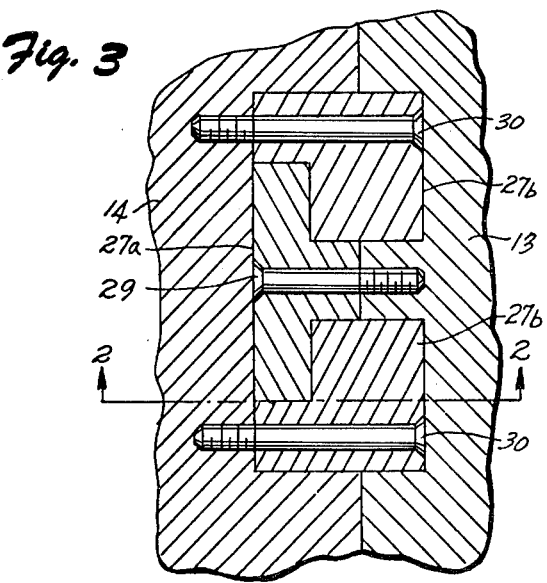
FIG. 3 is a sectional view of a portion of the molding apparatus depicting the arrangement for interlocking an end section and the adjoining center section of the inner mold half.

As illustrated in FIG. 3, bearing 27a is secured to center section 13 by fasteners 29, and bearing 27b is secured to end section 14 by fasteners 30. Two or more such interlocking bearings are provided for the contiguous surfaces of sections 13 and 14 and two or more are provided for the contiguous surfaces of sections 13 and 15. These interlocking bearings maintain end sections 14 and 15 in contiguous relationship with center section 13 at all times during the operation of the molding apparatus. Wear resistant plates 32 and 33, which are secured to end section 14 and center section 13 respectively, and wear resistant plates 34 and 35, which are secured to end section 15 and center section 13, respectively, extend along the entire width of inner mold half 12 adjacent to plate forming cavity 31.

Attaching bar 17 is maintained in contiguous relationship with end section 15 by a latch 21, which slides in a passage 22 formed in end section 15. Latch 21 is urged to the right, as viewed in FIG. 2, by a spring 23 in passage 22 to engage a notch 24 in attaching bar 17. Latch 21 has a bore 36 with a sloping surface opposite notch 24. End section 15 has a bore 37 aligned with bore 36 when latch 21 engages notch 24. A pin 38, which is secured to a stationary portion of the molding apparatus, such as actuator 26, extends through a bore 39 in center section 13 to a point immediately adjacent to and to the side of end section 15. In the course of the operation of the molding apparatus, pin 38 moves into bore 37 and the side of its tip slides against the sloping surface of bore 36. Thereafter, as pin 38 moves further into bore 36, latch 21 is released from notch 24, thereby freeing attaching bar 17. When pin 38 is withdrawn from bores 36 and 37, spring 23 urges latch 21 back into engagement with notch 24 to hold attaching bar 17. The arrangement for holding and freeing attaching bar 16, not shown in the drawings, is identical to the arrangement described in connection with attaching bar 17.

A cylindrical matrix 40 lies in a matching cylindrical recess 41 on the surface of outer mold half 11. A movable clamp 42, which is driven by an arm 43 of a pneumatic cylinder, secures one end of matrix 40 adjacent to attaching bar 16, and a movable clamp 44, which is driven by an arm 45 of a pneumatic cylinder, secures the other end of matrix 40 adjacent to attaching bar 17. Two or more such clamps are provided to hold each end of matrix 40.

In FIG. 4, a movable clamp 46, which is driven by an arm 47 of a pneumatic cylinder, secures one side of matrix 40 at the center of its length. A movable indexing clamp 48, which is driven by an arm 49 of a pneumatic cylinder, secures the other side of matrix 40 at the center of its length. At the center of this side of its length, matrix 40 has a notch 50 (FIG. 6) that matches a rail 51 formed on clamp 48. Clamp 48 serves to index matrix 40 longitudinally in outer mold half 11 when notch 50 engages rail 51. Clamp 48 has a raised end wall 52 (FIG. 5) that matches the curvature of matrix 40 and outer mold half 11. End wall 52 clamps the side of matrix 40 against outer mold half 11.

To install a new matrix in the molding apparatus, mold halves 11 and 12 are separated, and clamps 42, 44, 46, and 48 are opened by moving arms 43, 45, 47, and 49 in the direction indicated by the arrows associated with such arms. Then the matrix to be installed is set in recess 41 such that its indexing notch 50 engages rail 51. Finally, clamps 42, 44, 46, and 48 are returned to the positions shown in FIGS. 2 and 4 by driving arms 43, 45, 47, and 49, respectively, in the other direction. In summary, the described clamps serve to index and secure a matrix in recess 41 of outer mold half 11 with a minimum of operator time and effort.

In FIG. 4 is shown a conduit 55 for injecting a molten plastic material from which the printing plates are made into cavity 31 via a network 56 passing around and over clamp 46.

FIG. 7 is a top view of the molding apparatus taken through a section lying above matrix 40 and plate forming cavity 31 to depict the mechanism for controlling the movement of end section 15. The disclosed mechanism is one of an identical pair for controlling end section 15, the other mechanism being located below matrix 40 and plate forming cavity 31. A pair of identical mechanisms is also provided for controlling the movement of end section 14. A compression spring 60 lies around a guiding rod 61 in axially aligned bores 62 and 63 formed in end section 15 and center section 13, respectively. Spring 60 is retained between the end of bore 62 and a spring keeper 69 secured to center section 13 at the end of bore 63. Spring keeper 69 is free to ride on rod 61, which fits in a recess 70 at one end to secure rod 61 against axial movement, and has a stop 64 at the other end to prevent spring keeper 69 from riding off rod 61. When inner mold half 12 mates with outer mold half 11, spring 60 urges a flat guiding surface 65 on the side of end section 15 against a flat guiding surface 66, which protrudes from outer mold half 11. During movement of center section 13 through the first incremental distance shown in FIG. 1B, spring 60 holds surface 65 against surface 66 so the contiguity between center section 13 and end section 15 imposed by interlocking bearings 28a and 28b causes end section 15 to move parallel to surfaces 65 and 66, i.e., perpendicular to the movement of center section 13. A projection 67 on center section 13 rides in a slot 68 formed in end section 15. The length of slot 68 determines the first incremental distance of travel of center section 13. At the end of the first incremental distance, projection 67 has traversed the length of slot 68 and begins to carry end section 15 as a unit with center section 13 to start the second incremental distance of center section 13 described in connection with FIG. 1C. Thereafter, spring 60 compresses as center section 13 moves away from outer mold half 11.

Figure 9:
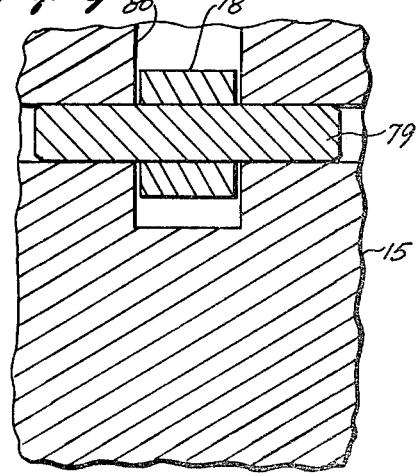
FIG. 9 is a side sectional view of a portion of the molding apparatus depicting part of the mechanical interconnection between an end section and its corresponding attaching block.

Reference is made to FIGS. 8 and 9 for a description of one of an identical pair of mechanisms for separating attaching bar 17 from end section 15. An identical pair of mechanisms is employed to separate attaching bar 16 from end section 14. A pin 75, which is secured to a stationary portion of the molding apparatus, such as actuator 26, extends through a bore 76 in center section 13 to a cavity 77 formed in end section 15. A finger 78 is mounted on a rotatable shaft 79 in a passage 80. As center section 13 moves through the first incremental distance, finger 78 moves to the left as viewed in FIG. 8 to a point directly above the tip of pin 75, and bores 36 and 37 move to the left as viewed in FIG. 2 to a point directly above the tip of pin 38. As center section 13 moves through the second incremental distance, finger 78 moves down to contact the side of the tip of pin 75, and the slanted surface of bore 36 bears against the tip of pin 38 to release latch 21. Thereafter, as center section 13 moves through the third incremental distance, pin 75 turns finger 78 in a clockwise direction, as viewed in FIG. 8, and drives bar 17 downwardly away from end section 15, as discussed above in connection with FIG. 1E.

Figure 10:
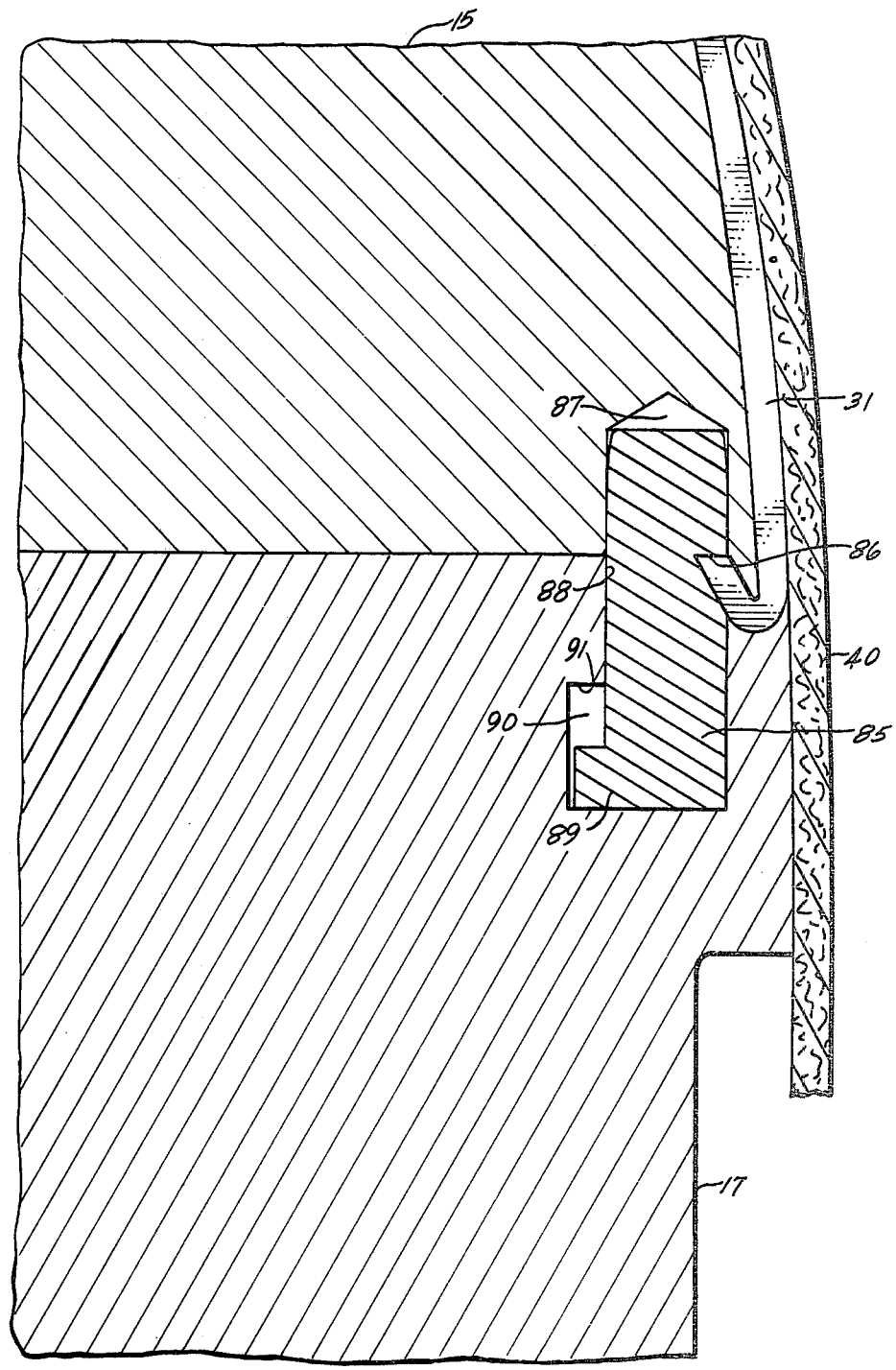
FIG. 10 is a top sectional view of a portion of the molding apparatus depicting one of the stripping pins for releasing the ends of the hooks on the molded printing plate.

Reference is made to FIG. 10 for a description of one of a plurality of identical pins for flipping the end of the molded plate off end 15. A plurality of identical pins are employed to flip the other end of the molded plate off end 14. Pin 85 has an indentation 86 that defines a portion of plate forming cavity 31, where the tip of the attaching hook is formed. Pin 85 occupies axially aligned bores 87 and 88 formed in end section 15 and attaching bar 17, respectively. The end of pin 85 lying in attaching bar 17 has a head 89 that occupies an enlargement 90 of bore 88. As center section 13 moves through the third incremental distance, without moving pin 85 relative to bar 15, attaching bar 17 separates from end section 15 until head 89 engages a shoulder 91 at the end of enlargement 90. At this point, center section 13 begins the fourth incremental distance, thereby partially withdrawing pin 85 from bore 87 and flipping the tip of the attaching hook at the end of the molded printing plate off end section 15, as shown in FIG. 1E.

The operation of sections 12 through 14, bars 16 and 17, and pins 85 is reversible. When actuator 26 drives center section 13 back toward outer mold half 11, the portion of center section 13 adjacent to attaching bar 17 (FIG. 2) pushes attaching bar 17 into contact with end section 15, thereby returning pin 85 to the position shown in FIG. 10 and returning latch 21 to the position shown in FIG. 2; spring 60 pushes end section 15 back with center section 13 as a unit until guiding surface 65 abuts guiding surface 66 (FIG. 7); and thereafter end section 15 moves perpendicular to center section 13 as projection 67 traverses slot 68 to the position shown in FIG. 7.

The described apparatus is capable of automatically producing multiple printing plates. An electronic or hydraulic controller first operates actuator 26 to mate inner mold half 12 with outer mold half 11 in the described manner, injects then molten plastic into cavity 31 to form a molded plate, and finally operates actuator 26 to separate inner mold half 12 from outer mold half 11 to release the molded plate. This cycle is then repeated until the required number of plates are produced.

The molding apparatus would be provided with conventional water cooling ducts, which are not shown. Also, in order to facilitate manufacture and assembly of parts, some of the components of the molding apparatus represented in the drawings as a single part would in fact be two or more parts attached together by conventional techniques.

The described embodiment of the invention is only considered to be preferred and illustrative of the inventive concept; the scope of the invention is not to be restricted to such embodiment. Various and numerous other arrangements may be devised by one skilled in the art without departing from the spirit and scope of this invention. For example, numerous other ways could be devised for controlling the movement of the center section, the end sections, and the attaching bars to provide the desired mode of mold release. For example, the movement could be controlled hydraulically or electronically. If the printing plate to be molded does not have attaching hooks at its ends, a different arrangement for attaching the ends of the molded plate to the end sections of the inner mold half could be employed.

What is claimed is:

1. A method for releasing a flexible printing plate from the inner surface of a curved matrix after formation of the printing plate in a mold, the method comprising in the order recited the steps of:

moving the ends of the plate inwardly toward each other and away from the matrix only along a first axis to separate the ends of the plate from the matrix and to flex the center of the plate into stationary contact with the matrix; and without any intervening movement of the ends of the plate following the movement thereof along the first axis, moving the ends of the plate away from the matrix only along a second axis perpendicular to the first axis to separate the center of the plate from the matrix.

2. A method for releasing a curved flexible printing plate from a mold having an outer mold half into which a curved matrix clamps and an inner mold half in which the plate is formed against the inner surface of the matrix, the inner mold half having a wedge-shaped center section converging toward the outer mold half, adjoining end sections, and means for clamping the ends of the plate to the end sections of the inner mold half, the method comprising the steps of:

withdrawing the center section from the outer mold half;

during the initial portion of the withdrawal of the center section, drawing the end sections together in a direction perpendicular to the withdrawal of the center section, while restraining movement of the end sections parallel to the withdrawal;

during the final portion of the withdrawal of the center section, restraining relative movement between the end sections and the center section to withdraw the end sections with the center section as a unit; and releasing the clamping means after withdrawal of the end sections with the center section as a unit.

3. The method of claim 2, in which the matrix is a portion of a cylinder, the ends of the plate in the mold lie on a first axis, the center of the plate in the mold lies on a second axis perpendicular to the first axis, and the withdrawing step withdraws the center section along the second axis.

4. The method of claim 3, additionally comprising the step of rotating the ends of the plate outwardly away from the end sections of the inner mold half after the step of releasing the clamping means so as to peel the plate from the end sections of the inner mold half.

5. The method of claim 4, in which the plate has a laterally extending hook at each end that bends away from the matrix, the inside of the hooks are formed by the end sections of the inner mold half, and the outside of the hooks are formed by the clamping means, and the step of releasing the clamping means comprises moving the clamping means away from the end sections of the inner mold half in a direction parallel to the second plane.

6. The method of claim 2, additionally comprising the step of rotating the ends of the plate outwardly away from the end sections of the inner mold half after the step of releasing the clamping means so as to peel the plate from the end sections of the inner mold half.

7. The method of claim 2, in which the plate has a laterally extending hook at each end that bends away from the matrix, the inside of the hooks are formed by the end sections of the inner mold half, and the outside of the hooks are formed by the clamping means, and the step of releasing the clamping means comprises moving the clamping means away from the end sections of the inner mold half in a direction parallel to the direction of withdrawal of the center section.

8. The method of claim 7, additionally comprising the step of rotating the ends of the plate outwardly away from the end sections of the inner mold half after the step of releasing the clamping means so as to peel the plate from the end sections of the inner mold.

9. The method of claim 8, in which the step of rotating the ends of the plate outwardly away from the end sections of the inner mold half comprises flipping the laterally extending hooks at each end of the plate off the end sections of the inner mold half after the step of releasing the clamping means.

10. A method of molding a convexly curved flexible printing plate in a curved mold cavity having a concave matrix surface, the matrix surface being slightly less than one-half of a right cylinder, the method comprising the following steps:

injecting a molten plastic material into the mold cavity to fill the space therein;

cooling the injected plastic material to a solid while in the mold cavity; and after cooling the plate effecting a two stage separation thereof by moving the ends of the plate away from the matrix surface first together and inwardly only along a first axis to separate approximately the end quarters of the plate from the matrix surface while flexing approximately the center half of the plate into stationary contact with the matrix surface, and second, without any intervening movement of the ends of the plate following the movement thereof along the first axis, only along a second axis perpendicular to the first axis to separate approximately the center half of the plate from the matrix.

11. The method of claim 1, additionally comprising the step of maintaining the ends of the matrix fixed while moving the ends of the plate inwardly away from the matrix.

12. The method of claim 10, additionally comprising the step of maintaining the ends of the matrix fixed while moving the ends of the plate inwardly away from the matrix.

* * * * *

UNITED STATES PATENT AND TRADEMARK OFFICE
CERTIFICATE OF CORRECTION

PATENT NO. : 4,136,150

DATED : January 23, 1979

INVENTOR(S) : John C. Darnall, Jr.

It is certified that error appears in the above-identified patent and that said Letters Patent are hereby corrected as shown below:

Col. 2, line 11, insert the following new paragraph:

--Specifically, the invention is a method for releasing a flexible printing plate from the inner surface of a curved matrix in a two-stage separation after formation of the printing plate in a mold. The first step comprises moving the ends of the plate inwardly toward each other and away from the matrix only along a first axis to separate the ends of the plate from the matrix and to flex the center of the plate into stationary contact with the matrix. The second stage comprises moving the ends of the plate away from the matrix only along a second axis perpendicular to the first axis to separate the center of the plate from the matrix without any intervening movement of the ends of the plate following the movement thereof along the first axis.--

Col. 4, line 36, "section 12" should be --section 13--.

Signed and Sealed this

Eleventh Day of September 1979

[SEAL]

Attest:

LUTRELLE F. PARKER

Attesting Officer  Acting Commissioner of Patents and Trademarks